United States Patent [19]

Maria Bertens

[11] 3,919,066

[45] Nov. 11, 1975

[54] METHOD OF MANUFACTURING ETCHED PATTERNS

[75] Inventor: Theodorus Cornelius Johannes Maria Bertens, Emmasingel, Eindhoven, Netherlands

[73] Assignee: U.S. Philips Corporation, New York, N.Y.

[22] Filed: Sept. 26, 1973

[21] Appl. No.: 400,879

[30] Foreign Application Priority Data

Oct. 7, 1972 Netherlands ........................ 7213625

[52] U.S. Cl. ................................................ 204/192

[51] Int. Cl.² ........................................... C23C 15/00

[58] Field of Search ..................................... 204/192

[56] References Cited

UNITED STATES PATENTS

| | | | |
|---|---|---|---|
| 3,723,277 | 3/1973 | Schmiedecke | 204/192 |
| 3,839,177 | 10/1974 | Dimigen | 204/192 |

OTHER PUBLICATIONS

"Characteristics of NbN Dayem Bridges" by Janocko et al., Journal of Applied Physics, Vol. 42, No. 1, Jan. 1971, pp. 182–185.

*Primary Examiner*—Oscar R. Vertiz
*Assistant Examiner*—Wayne A. Langel
*Attorney, Agent, or Firm*—Frank R. Trifari; Norman N. Spain

[57] ABSTRACT

Use of silicon oxide as an etching mask for sputter-etching.

1 Claim, 3 Drawing Figures

METHOD OF MANUFACTURING ETCHED PATTERNS

The invention relates to an improvement in a method of manufacturing etched patterns in thin layers having defined edge profiles varying within wide limits by means of a sputter-etching process, in which an etching mask having defined edge profiles is used and the etching mask and the material to be etched are removed approximately equally rapidly, described in U.S. Patent Application Ser. No. 241,243, filed Apr. 5, 1972 now U.S. Pat. No. 3,839,177.

In U.S. Pat. No. 3,839,177 the disclosure of which is herein incorporated by reference it is described that by means of sputter-etching patterns can be formed the edges of which have a profile which can be chosen within wide limits.

As an example it is described in the said application that a layer of a photolacquer may be used as an etching mask in which a pattern is formed by exposure and development. The edges of the pattern are given a desired profile, for example, by thermal treatment of the photolacquer layer.

Although the said U.S. Patent was not restricted to the use of a photolacquer layer as an etching mask, further investigation has proved that a number of heat-resistant materials have been found to be particularly suitable for use as an etching mask in the method mentioned in the preamble.

The method mentioned in the preamble is therefore characterized in that a layer of silicon oxide or aluminum is used as an etching mask.

One of the advantages of silicon oxide and aluminum is that the rates of sputtering used can be high, that the temperature of the article to be sputtered during etching is little critical and at the same time the said materials do not leave substantially any undesired residues during etching, and that patterns having the desired edge profiles can be provided in a comparatively simple manner in layers of said materials by means of conventionally used methods.

The method according to the invention will now be described in greater detail with reference to a few embodiments and the accompanying drawing.

Figure 1:
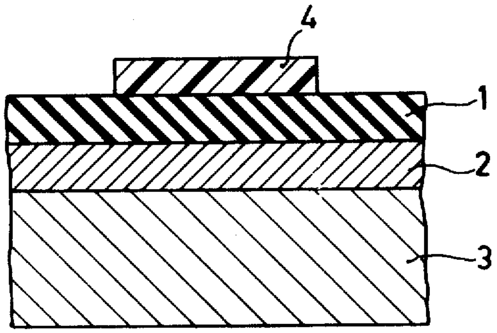
Figure 2:
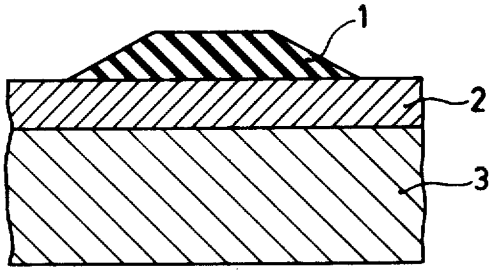
Figure 3:
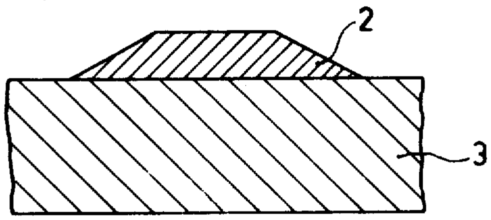

FIGS. 1 to 3 of the accompanying drawing are diagrammatic sectional views of a part of an article in successive stages of treatment while using the method according to the invention.

On a substrate 3 (see FIG. 1) of silicon, in which a surface layer, not shown, has been converted into silicon oxide, a 1.5 $\mu$m thick layer 2 of nickel iron is present on which a 0.8 $\mu$m thick layer 1 of silicon dioxide is provided, for example, by sputtering.

A layer 4 of a photolacquer which is commercially available as "Shipley AZ 111" is provided on the layer 1 and heated at 120°C for a certain period of time.

The photolacquer layer 4 is exposed via a mask which has the desired pattern and is developed as a result of which the shape shown in FIG. 1 is obtained.

The photolacquer layer 4 serves as a mask during the chemical etching treatment of layer 1, in which the pattern of layer 4 is transferred to the layer 1 in such manner that the edge profile of the layer 1 is adjusted by suitable choice of the heating time of the photo-lacquer layer 4 and the composition of the etching bath.

The slope of the edge profile 5 depends upon the extent of adhesion of the photolacquer used (determined by the heating time) and the fluoride concentration used.

In the example described a profile slope in layer 1 of approximately 10° is obtained in an etching bath containing 40 g of $NH_4F$ and 10 ml of 40% by weight HF in 60 ml of $H_2O$ and a heating time of the photolacquer layer of 3 hours (see FIG. 2).

As described in the above-mentioned Dutch Patent Application, the pattern of the layer 1 is then transferred by "sputter"-etching to layer 2 (see FIG. 3) with a profile slope of approximately 20°, the energy of the ion source being 1 W/cm$^2$ and the temperature of the layer 2 being approximately 300°C. The layer 1 and the non-masked part of the layer 2 are removed in approximately 90 minutes.

If the layer 1 consists of aluminum, the slope of the aluminum pattern can be adjusted to, for example, 30° or 45° by the choice of the content of hydrofluoric acid and nitric acid in a conventional etching bath for aluminum which contains acetic acid and phosphoric acid in addition to said acids.

The method according to the invention is used, for example, in manufacturing multilayer wiring in integrated circuits and layers having particular magnetic properties in integrated magnetic heads. Besides the said nickel iron, for example, the layer 2 may consist of an insulation material, such as silicon nitride, or of metals, such as platinum, which are difficult to etch chemically.

What is claimed is:

1. In a method of manufacturing sputter etched patterns in thin layers having desired edge profiles comprising applying to a substrate a thin layer of a substance to be sputter etched, applying to the portions of said thin layer desired to be protected from sputter etching a sputter etching mask having the desired edge profile, said sputter etching mask being formed on said layer by depositing a layer of silicon dioxide thereon, applying a layer of photolacquer on said silicon dioxide layer, selectively exposing said photolacquer layer, developing and heating said exposed photolacquer layer, thereby leaving exposed selected portions of the silicon dioxide layer, removing by etching the exposed portions of the silicon dioxide layer to produce a sputter etching mask of silicon dioxide having the desired edge profile, and then sputter etching to remove the silicon dioxide mask and unprotected thin layer at substantially the same time and to form the etched pattern in the thin layer.

* * * * *